(12) United States Patent
Jiang et al.

(10) Patent No.: US 12,490,304 B2
(45) Date of Patent: Dec. 2, 2025

(54) INFORMATION TRANSMISSION METHOD WITH SHARED COT AND COMMUNICATIONS DEVICE

(71) Applicant: VIVO MOBILE COMMUNICATION CO., LTD., Dongguan (CN)

(72) Inventors: Lei Jiang, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 882 days.

(21) Appl. No.: 17/737,986

(22) Filed: May 5, 2022

(65) Prior Publication Data
US 2022/0264650 A1   Aug. 18, 2022

Related U.S. Application Data

(63) Continuation of application No. PCT/CN2020/126507, filed on Nov. 4, 2020.

(30) Foreign Application Priority Data

Nov. 7, 2019   (CN) .......................... 201911084188.1

(51) Int. Cl.
*H04W 74/0816* (2024.01)
*H04W 72/23* (2023.01)
*H04W 74/00* (2009.01)

(52) U.S. Cl.
CPC ....... *H04W 74/0816* (2013.01); *H04W 72/23* (2023.01); *H04W 74/002* (2013.01)

(58) Field of Classification Search
CPC ............. H04W 74/0816; H04W 72/23; H04W 74/002; H04W 74/0808; H04W 74/006; H04W 16/14; Y02D 30/70
See application file for complete search history.

(56) References Cited

U.S. PATENT DOCUMENTS

2019/0313454 A1* 10/2019 Pu .......................... H04W 24/02
2020/0154471 A1*  5/2020 Sun ....................... H04W 74/006
2021/0235492 A1*  7/2021 Iyer ........................ H04W 72/23
(Continued)

FOREIGN PATENT DOCUMENTS

CN       104717687 A       6/2015
CN       107734713 A       2/2018
(Continued)

OTHER PUBLICATIONS

International Search Report issued in corresponding International Application No. PCT/CN2020/126507, mailed Jan. 26, 2021, 4 pages.
(Continued)

*Primary Examiner* — Kibrom T Hailu
(74) *Attorney, Agent, or Firm* — IPX PLLC

(57) ABSTRACT

This application discloses a method for information transmission with a shared Channel Occupancy Time (COT) and a communications device. When performed by a first device, the method includes: sending indication information to a second device; where the indication information is used to indicate a power detection threshold for COT sharing or a service type, and different power detection thresholds for COT sharing correspond to different service types.

17 Claims, 2 Drawing Sheets

Send indication information to a second device; where the indication information is used to indicate a power detection threshold for COT sharing or a service type, and different power detection thresholds for COT sharing correspond to different service types ~102

(56) References Cited

U.S. PATENT DOCUMENTS

| | | | | |
|---|---|---|---|---|
| 2021/0307036 A1* | 9/2021 | Myung | ............ | H04W 72/1268 |
| 2022/0060305 A1* | 2/2022 | Ijaz | ........................ | H04L 5/001 |
| 2022/0095305 A1* | 3/2022 | Höhne | ................ | H04W 74/002 |
| 2022/0141872 A1* | 5/2022 | Wang | ................ | H04W 74/0816 |
| | | | | 370/329 |

FOREIGN PATENT DOCUMENTS

| | | |
|---|---|---|
| CN | 109863708 A | 6/2019 |
| EP | 3407659 A1 | 11/2018 |
| WO | 2017078842 A1 | 5/2017 |

OTHER PUBLICATIONS

Sony, "Channel access for NR unlicensed operations", 3GPP TSG RAN WG1 #96bis R1-1906834, May 2019.
First Office Action issued in related Chinese Application No. 201911084188.1, mailed Jul. 26, 2022, 39 pages.
Nokia et al, "Feature Lead's Summary #2 on Channel Access Procedures", 3GPP TSG RAN WG1 Meeting #98bis R1-1911706, Oct. 2019, 27 pages.

* cited by examiner

Send indication information to a second device; where the indication information is used to indicate a power detection threshold for COT sharing or a service type, and different power detection thresholds for COT sharing correspond to different service types ~102

FIG. 1

Receive indication information from a first device; where the indication information is used to indicate a power detection threshold for COT sharing or a service type, and different power detection thresholds for COT sharing correspond to different service types ~202

FIG. 2

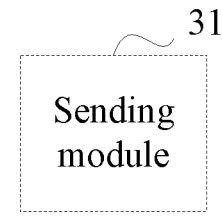

FIG. 3

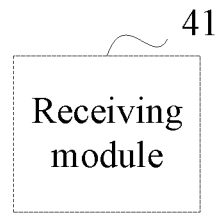

FIG. 4

INFORMATION TRANSMISSION METHOD WITH SHARED COT AND COMMUNICATIONS DEVICE

CROSS-REFERENCE TO RELATED APPLICATIONS

This application is a continuation of International Application No. PCT/CN2020/126507, filed Nov. 4, 2020, which claims priority to Chinese Patent Application No. 201911084188.1, filed Nov. 7, 2019. The entire contents of each of the above-referenced applications are expressly incorporated herein by reference.

TECHNICAL FIELD

This application relates to the field of communications, and in particular, to an information transmission method with a shared Channel Occupancy Time (COT) and a communications device.

BACKGROUND

In a mobile communication system, an unlicensed band may serve as a supplement of a licensed band, to help an operator expand a service capacity. To make the deployment of a New Radio (NR) system keep consistent and maximize unlicensed accesses based on an NR system as much as possible, an unlicensed band may work in bands of 5 GHz, 37 GHz, and 60 GHz. The high bandwidth (80 MHz or 100 MHz) of an unlicensed band can reduce the implementation complexity of a base station (gNB) and a terminal (UE, User Equipment). However, because an unlicensed band is shared by multiple Radio Access Technology (RAT) such as wireless fidelity WiFi, radar, and Long Term Evolution License Assisted Access (LTE-LAA), the unlicensed band needs to be used based on some rules such as Listen Before Talk (LBT) and Maximum Channel Occupancy Time (MCOT), to ensure that all devices can use this resource fairly.

A transmission node may also be referred to as an initiating and may include a base station or UE. After obtaining a channel, a transmission node may share a COT with a receiving node. The receiving node may also be referred to as a responding device and may also include UE or a base station. That is, when the base station is an initiating device, the UE is a responding device; or when the UE is an initiating device, the base station is a responding device.

Usually, the base station can configure a power detection threshold for COT sharing for the UE. After sharing a COT with the base station, according to a configured power detection threshold for COT sharing, the UE can distinguish whether the base station can transmit a Downlink (DL) signal/channel in the COT initiated by the UE (UE initiated COT). However, in consideration of different service types, the UE currently cannot control the base station to transmit some specific services in the shared COT.

SUMMARY

Embodiments of this application provide an information transmission method with a shared COT and a communications device, so as to solve the related-art problem of how a base station transmits some specific services in a shared COT initiated by a terminal device.

A first aspect provides an information transmission method with a shared COT, applied to a first device. The method includes: sending indication information to a second device; where the indication information is used to indicate a power detection threshold for COT sharing or a service type, and different power detection thresholds for COT sharing correspond to different service types.

A second aspect provides an information transmission method with a shared COT, applied to a second device. The method includes: receiving indication information from a first device; where the indication information is used to indicate a power detection threshold for COT sharing or a service type, and different power detection thresholds for COT sharing correspond to different service types.

A third aspect provides a first device. The first device includes: a sending module, configured to send indication information to a second device; where the indication information is used to indicate a power detection threshold for COT sharing or a service type, and different power detection thresholds for COT sharing correspond to different service types.

A fourth aspect provides a second device. The second device includes: a receiving module, configured to receive indication information from a first device; where the indication information is used to indicate a power detection threshold for COT sharing or a service type, and different power detection thresholds for COT sharing correspond to different service types.

A fifth aspect provides a communications device. The communications device includes: a processor, a memory, and a computer program stored in the memory and executable on the processor. When the computer program is executed by the processor, steps in the method provided in the first aspect are implemented.

A sixth aspect provides a communications device. The communications device includes: a processor, a memory, and a computer program stored in the memory and executable on the processor. When the computer program is executed by the processor, steps in the method provided in the second aspect are implemented.

A seventh aspect provides a computer-readable storage medium, storing a computer program. When the computer program is executed by the processor, steps in the method provided in the first aspect are implemented.

An eighth aspect provides a computer-readable storage medium, storing a computer program. When the computer program is executed by the processor, steps in the method provided in the second aspect are implemented.

In the embodiments of this application, when communicating with the second device, the first device may send the indication information to the second device; where the indication information is used to indicate a power detection threshold for COT sharing or a service type, and different power detection thresholds for COT sharing correspond to different service types. In this way, when the first device is a network device and the second device is a terminal device or the first device is a terminal device and the second device is a network device, and the network device shares the COT initiated by the terminal device, the network device can transmit, in the COT initiated by the terminal device, a service corresponding to the indication information.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 1 is a schematic flowchart of an information transmission method with a shared COT according to an embodiment of this application;

FIG. 2 is a schematic flowchart of an information transmission method with a shared COT according to an embodiment of this application;

FIG. 3 is a schematic structural diagram of a first device according to an embodiment of this application;

FIG. 4 is a schematic structural diagram of a second device according to an embodiment of this application;

DETAILED DESCRIPTION

Figure 5:
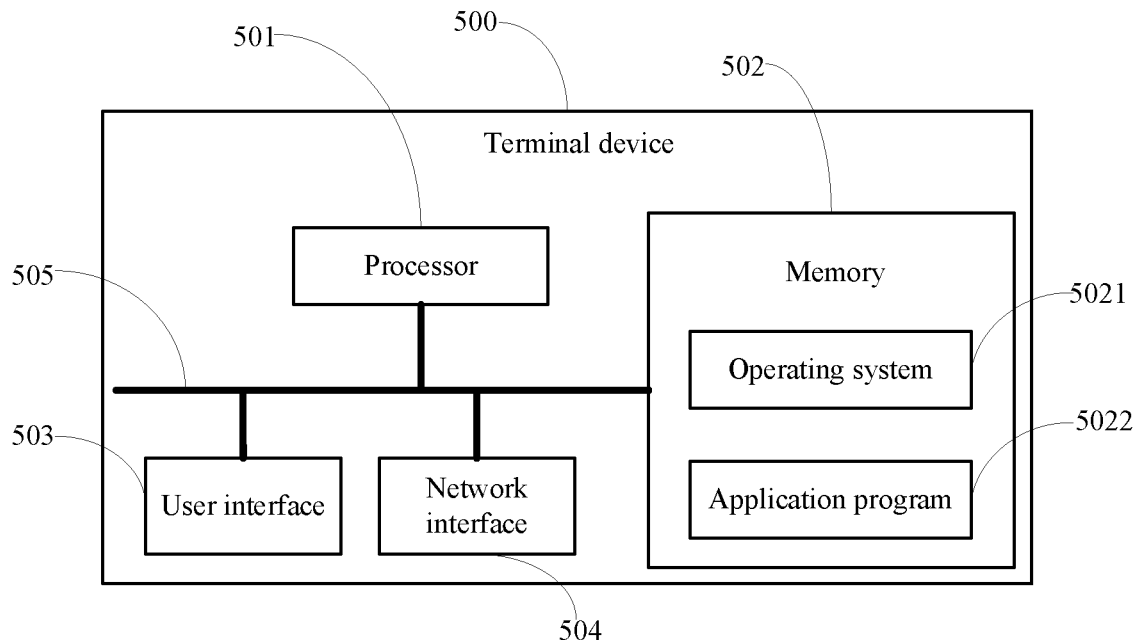
FIG. 5 is a schematic structural diagram of a terminal device according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The technical solutions in this application may be applied to various communication systems, for example, a Long Term Evolution (LTE)/Long Term Evolution advanced (LTE-A) system, an LTE Frequency Division Duplex (FDD) system, an LTE Time Division Duplex (TDD) system, a Universal Mobile Telecommunications System (UMTS) or a Worldwide Interoperability for Microwave Access (WiMAX) communications system, a 5G system, or an NR system.

The terminal device may be understood as user equipment UE, also known as a mobile terminal, mobile user equipment, or the like, and may communicate with one or more core networks through a, for example, Radio Access Network (RAN). The terminal device may be a mobile terminal, for example, a mobile phone (also referred to as a "cellular" phone) and a computer with a mobile terminal, for example, may be a portable, pocket-sized, handheld, computer built-in, or in-vehicle mobile apparatus, and can also be a flying device such as a drone and an aircraft, which exchanges voice and/or data with a radio access network.

The network device can be understood as a core network or a base station. The base station may be a Base Transceiver Station (BTS) in GSM or CDMA, a NodeB in WCDMA, an evolved NodeB (eNB or e-NodeB) in LTE, a 5G gNodeB (gNB), or a network side device in a subsequent evolved communication system. This is not limited in this application. However, for ease of description, the following embodiments use gNB as an example for description.

The following describes in detail the technical solutions provided in the embodiments of this application with reference to the accompanying drawings.

FIG. 1 is a schematic flowchart of an information transmission method with a shared COT according to an embodiment of this application. The method may be performed by a first device, for example, a terminal device or a network device. In other words, the method may be performed by software or hardware installed on a terminal device or a network device. As shown in FIG. 1, the method may include the following step:

S102: Send indication information to a second device; where the indication information is used to indicate a power detection threshold for COT sharing or a service type, and different power detection thresholds for COT sharing correspond to different service types.

In this embodiment of this application, the network device may configure different power detection thresholds (Energy Detection (ED) threshold) for COT sharing for the terminal device. One power detection threshold for COT sharing may correspond to one service type and different power detection thresholds for COT sharing may correspond to different service types, and different service types correspond to different priorities.

The service type can be Enhance Mobile Broadband (eMBB), Ultra Reliable Low Latency Communications (URLLC), massive Machine Type Communication (mMTC), or the like.

When communicating with the second device, the first device may send the indication information to the second device. The first device may be a terminal device and the second device may be a network device, or the first device may be a network device and the second device may be a terminal device.

For ease of understanding, the following descriptions will be given separately.

When the first device is a terminal device and the second device is a network device:

The terminal device can send the indication information to the network device through Uplink Control Information (UCI). The terminal device may be a terminal device of Configured Grant (CG).

After receiving the indication information, when sharing the COT (UE-initiated COT) initiated by the terminal device, the network device can transmit, in the COT initiated by the terminal device, a corresponding service according to the power detection threshold for COT sharing or the service type indicated by the indication information. For a specific implementation, refer to corresponding steps described in the subsequent embodiment shown in FIG. 2, which will not be described in detail herein.

In some embodiments, when the first device is a terminal device of configured grant and the second device is a network device, the network device may also configure a power detection threshold for COT sharing for configuration information of configured grant transmission of the terminal device. In this way, the indication information sent by the terminal device to the network device may also be used to indicate whether the terminal device uses the power detection threshold for COT sharing that corresponds to the configuration information of configured grant transmission of the terminal device. Different configuration information may correspond to different power detection thresholds for COT sharing.

After receiving the indication information, when sharing the COT initiated by the terminal device, the network device can transmit a corresponding service in the COT initiated by the terminal device. For a specific implementation, refer to corresponding steps described in the subsequent embodiment shown in FIG. 2, which will not be described in detail herein.

In some embodiments, when the indication information is used to indicate whether the terminal device uses the power detection threshold for COT sharing that corresponds to the configuration information, the quantity of bits occupied by the indication information may be 1. For example, the terminal device may use 1 bit in the UCI to indicate whether the terminal device uses the configured power detection threshold for COT sharing.

When the first device is a network device and the second device is a terminal device:

The network device can send indication information to the terminal device through Downlink Control Information (DCI,). The terminal device may be a scheduled terminal device.

After the network device sends the indication information, the terminal device can perform channel monitoring according to a corresponding power detection threshold based on the indication information. When the terminal device detects an idle channel and shares a COT of the idle channel with the network device, the network device can transmit, in the COT initiated by the terminal device, a service corresponding to the indication information.

Specifically, in a case that the indication information indicates a first power detection threshold for COT sharing, the network device may transmit, in the COT initiated by the terminal device, a service corresponding to a first service type or a service corresponding to a second service type;

where the first service type is a service type corresponding to the first power detection threshold for COT sharing, and a power detection threshold for COT sharing that corresponds to the second service type is greater than or equal to the first power detection threshold for COT sharing. The number of the second service types may be one or more.

In a case that the indication information indicates a third service type, the network device may transmit, in the COT initiated by the terminal device, a service corresponding to the third service type or a service corresponding to a fourth service type; where a power detection threshold for COT sharing that corresponds to the fourth service type is greater than or equal to a power detection threshold for COT sharing that corresponds to the third service type.

For example, services transmitted by the terminal device include three services: eMBB, URLLC, and mMTC. Power detection thresholds for COT sharing configured by the network device for eMBB, URLLC, and mMTC are A, B, and C respectively, and C<A<B.

Assuming that the network device indicates A to the terminal device through the DCI, the terminal device can perform channel monitoring according to A after receiving the indication information. When the terminal device detects an idle channel and shares the COT of the idle channel with the network device, the network device can transmit eMBB or transmit eMBB and URLLC in the COT initiated by the terminal device.

Assuming that the network device indicates a service type of mMTC to the terminal device through the DCI, after receiving the indication information, the terminal device can perform channel monitoring according to a power detection threshold (that is, C) for COT sharing that corresponds to the service type of mMTC. When the terminal device detects an idle channel and shares the COT of the idle channel with the network device, the network device can transmit mMTC or transmit eMBB, URLLC, and mMTC in the COT initiated by the terminal device.

In some embodiments, when the indication information is used to indicate the power detection threshold for COT sharing or the service type, the quantity of bits occupied by the indication information may be determined according to the number of service types.

For example, when the number of service types is 3, considering the maximum power detection threshold configured for the terminal device, 2 bits need to be used for the indication information. 2 bits correspond to 4 combinations. 3 combinations of the 4 combinations may indicate the three different service types or three power detection thresholds for COT sharing that correspond to the three service types, and the remaining one combination can indicate the maximum power detection threshold of the terminal device or a default power detection threshold for COT sharing.

In some embodiments, when the first device is a terminal device of configured grant and the second device is a network device, when needing to transmit multiple services, the terminal device may transmit the multiple services based on at least the following two rules:

First Rule:

The terminal device may monitor a channel according to a maximum power detection threshold of multiple power detection thresholds for COT sharing that correspond to service types of the multiple services; and in a case that an idle channel is detected, preferentially transmit a service corresponding to a service type corresponding to the maximum power detection threshold, and then transmit other services.

In this way, when transmitting multiple services, the terminal device can preferentially transmit one of the services, and then transmit other services, so that different services can access a channel according to different priorities.

Second Rule:

The terminal device may monitor a channel according to a minimum power detection threshold of multiple power detection thresholds for COT sharing that correspond to service types of the multiple services; and in a case that an idle channel is detected, simultaneously transmit the multiple services that need to be transmitted.

For example, services transmitted by the terminal device include three services: eMBB, URLLC, and mMTC. Power detection thresholds for COT sharing configured by the network device for eMBB, URLLC, and mMTC are A, B, and C respectively, and C<A<B. In this case, when performing channel monitoring, the terminal device can perform channel monitoring according to B, and after detecting an idle channel, preferentially transmit URLLC, and then transmit eMBB and mMTC; or can perform channel monitoring according to C, and after detecting an idle channel, simultaneously transmit the three services: eMBB, URLLC, and mMTC.

In the embodiments of this application, when communicating with the second device, the first device may send the indication information to the second device; where the indication information is used to indicate a power detection threshold for COT sharing or a service type, and different power detection thresholds for COT sharing correspond to different service types. In this way, when the first device is a network device and the second device is a terminal device or the first device is a terminal device and the second device is a network device, and the network device shares the COT initiated by the terminal device, the network device can transmit, in the COT initiated by the terminal device, a service corresponding to the indication information.

FIG. 2 is a schematic flowchart of an information transmission method with a shared COT according to an embodiment of this application. The method may be performed by a second device, for example, a terminal device or a network device. In other words, the method may be performed by software or hardware installed on a terminal device or a network device. As shown in FIG. 2, the method may include the following step:

S202: Receive indication information from a first device; where the indication information is used to indicate a power detection threshold for COT sharing or a service type, and different power detection thresholds for COT sharing correspond to different service types.

In this embodiment of this application, the network device may configure different power detection thresholds for COT sharing for the terminal device. One power detection threshold for COT sharing may correspond to one service type and different power detection thresholds for COT sharing may correspond to different service types, and different service types correspond to different priorities. The service type can be eMBB, URLLC, mMTC, or the like.

When the first device communicates with the second device, the second device may receive the indication information from the first device. The first device may be a terminal device and the second device may be a network device, or the first device may be a network device and the second device may be a terminal device.

For ease of understanding, the following descriptions will be given separately.

When the first device is a terminal device and the second device is a network device:

The network device can receive the indication information sent by the terminal device through UCI. The terminal device may be a terminal device of configured grant.

After receiving the indication information, when sharing the COT initiated by the terminal device, the network device can transmit, in the COT initiated by the terminal device, a service corresponding to the indication information.

Specifically, in a case that the indication information indicates a first power detection threshold for COT sharing, the network device can transmit, in the COT initiated by the terminal device, a service corresponding to a first service type or a service corresponding to a second service type.

The first service type is a service type corresponding to the first power detection threshold for COT sharing, and a power detection threshold for COT sharing that corresponds to the second service type is greater than or equal to the first power detection threshold for COT sharing. The number of the second service types may be one or more.

In a case that the indication information indicates a third service type, the network device can transmit, in the COT initiated by the terminal device, a service corresponding to the third service type or a service corresponding to a fourth service type; where a power detection threshold for COT sharing that corresponds to the fourth service type is greater than or equal to a power detection threshold for COT sharing that corresponds to the third service type.

For example, services transmitted by the terminal device include three services: eMBB, URLLC, and mMTC. Power detection thresholds for COT sharing configured by the network device for eMBB, URLLC, and mMTC are A, B, and C respectively, and C<A<B.

Assuming that the terminal device indicates A to the network device through the UCI, when the terminal device shares the COT with the network device, the network device can transmit eMBB or transmit eMBB and URLLC in the COT initiated by the terminal device.

Assuming that the terminal device indicates a service type corresponding to mMTC to the network device through the UCI, when the terminal device shares the COT with the network device, the network device can transmit mMTC or transmit eMBB, URLLC, and mMTC in the COT initiated by the terminal device.

In some embodiments, when the indication information is used to indicate the power detection threshold for COT sharing or the service type, the quantity of bits occupied by the indication information may be determined according to the number of service types.

For example, when the number of service types is 3, considering the maximum power detection threshold configured for the terminal device, 2 bits need to be used for the indication information. 2 bits correspond to 4 combinations. 3 combinations of the 4 combinations may indicate the three different service types or three power detection thresholds for COT sharing that correspond to the three service types, and the remaining one combination can indicate the maximum power detection threshold of the terminal device.

In some embodiments, when the first device is a terminal device of configured grant and the second device is a network device, the network device may also configure a power detection threshold for COT sharing for configuration information of configured grant transmission of the terminal device. Different configuration information corresponds to different power detection thresholds for COT sharing. Different power detection thresholds for COT sharing correspond to different service types.

In this way, the indication information received by the network device may be further used to indicate whether the terminal device uses a power detection threshold for COT sharing that corresponds to configuration information of configured grant transmission of the terminal device.

After receiving the indication information, in a case that the indication information indicates that the terminal device uses a second power detection threshold for COT sharing that corresponds to first configuration information, when transmitting a service in the COT initiated by the terminal device, the network device may transmit a service corresponding to a fifth service type or a service corresponding to a sixth service type.

The fifth service type is a service type corresponding to the second power detection threshold for COT sharing, and a power detection threshold for COT sharing that corresponds to the sixth service type is greater than or equal to the second power detection threshold for COT sharing. The number of the sixth service types may be one or more.

For example, the configuration information of configured grant transmission of the terminal device includes configuration information 1, configuration information 2, and configuration information 3, and power detection thresholds for COT sharing configured by the network device for configuration information 1, configuration information 2, and configuration information 3 are respectively A, B, and C, where C<A<B, and A, B, and C respectively correspond to the three services: eMBB, URLLC, and mMTC.

Assuming that the indication information sent by the terminal device to the network device indicates that the network device uses the power detection threshold A for COT sharing that corresponds to configuration information 1, in the case of sharing the COT initiated by the terminal device, the network device can transmit eMBB or transmit eMBB and URLLC in the COT initiated by the terminal device.

In some embodiments, when the indication information indicates whether the terminal device uses the power detection threshold for COT sharing that corresponds to the configuration information, the quantity of bits occupied by the indication information may be 1. For example, the terminal device may use 1 bit in the UCI to indicate whether the terminal device uses the configured power detection threshold for COT sharing.

When the first device is a network device and the second device is a terminal device:

The terminal device may receive the indication information sent by the network device through DCI. The terminal device may be a scheduled terminal device.

After receiving the indication information, the terminal device may perform channel monitoring based on a corresponding power detection threshold according to the indication information.

When detecting an idle channel, the terminal device may share a COT of the idle channel with the network device. In a case of sharing the COT initiated by the terminal device, the network device can transmit, in the COT initiated by the terminal device, a service corresponding to the indication information. For a specific implementation, refer to corresponding steps described in the embodiment shown in FIG. 1, which will not be described in detail herein.

In the embodiments of this application, when the first device communicates with the second device, the second device may receive the indication information from the first device; where the indication information is used to indicate a power detection threshold for COT sharing or a service type, and different power detection thresholds for COT sharing correspond to different service types. In this way, when the first device is a network device and the second device is a terminal device or the first device is a terminal device and the second device is a network device, and the network device shares the COT initiated by the terminal device, the network device can transmit, in the COT initiated by the terminal device, a service corresponding to the indication information.

The above describes specific embodiments of this specification. Other embodiments are within the scope of the appended claims. In some cases, the actions or steps described in the claims can be performed in a different order from that in the embodiments and the desired result can still be achieved. In addition, the process described in the accompanying drawings does not necessarily achieve the desired result in a specific order shown or a continuous order. In some implementations, multiple-task processing and parallel processing are also possible or may be advantageous.

FIG. 3 is a schematic structural diagram of a first device according to an embodiment of this application. The first device includes a sending module 31.

The sending module 31 is configured to send indication information to a second device; where the indication information is used to indicate a power detection threshold for COT sharing or a service type, and different power detection thresholds for COT sharing correspond to different service types.

In some embodiments, in a case that the first device is a terminal device and the second device is a network device, the sending, by the sending module 31, indication information to a second device includes:
    sending the indication information to the second device through uplink control information UCI.

In some embodiments, the indication information is valid in a case that the second device shares a COT initiated by the first device.

In some embodiments, the indication information is further used to indicate whether the first device uses a power detection threshold for COT sharing that corresponds to configuration information of configured grant transmission of the first device;
    where different configuration information corresponds to different power detection thresholds for COT sharing.

In some embodiments, the quantity of bits occupied by the indication information is 1.

In some embodiments, in a case that the first device is a network device and the second device is a terminal device, the sending module 31 is further configured to:
    send the indication information to the second device through downlink control information DCI, and transmit, in a COT initiated by the second device, a service corresponding to the indication information.

In some embodiments, the indication information is valid in a case that the first device shares a COT initiated by the second device.

In some embodiments, the sending, by the sending module 31 in a COT initiated by the second device, a service corresponding to the indication information includes:
    in a case that the indication information indicates a first power detection threshold for COT sharing, transmitting, in the COT, a service corresponding to a first service type or a service corresponding to a second service type;
    where the first service type is a service type corresponding to the first power detection threshold for COT sharing, and a power detection threshold for COT sharing that corresponds to the second service type is greater than or equal to the first power detection threshold for COT sharing.

In some embodiments, the sending, by the sending module 31 in a COT initiated by the second device, a service corresponding to the indication information includes:
    in a case that the indication information indicates a third service type, transmitting, in the COT, a service corresponding to the third service type or a service corresponding to a fourth service type;
    where a power detection threshold for COT sharing that corresponds to the fourth service type is greater than or equal to a power detection threshold for COT sharing that corresponds to the third service type.

In some embodiments, the quantity of bits occupied by the indication information is determined according to the number of service types.

In some embodiments, in a case that the first device is a terminal device and the second device is a network device, the sending module 31 is further configured to:
    in a case of transmitting multiple services, monitor a channel according to a maximum power detection threshold of multiple power detection thresholds for COT sharing that correspond to service types of the multiple services; and
    in a case that an idle channel is detected, preferentially transmit a service corresponding to a service type corresponding to the maximum power detection threshold.

In some embodiments, in a case that the first device is a terminal device and the second device is a network device, the sending module 31 is further configured to:
    in a case of transmitting multiple services, monitor a channel according to a minimum power detection threshold of multiple power detection thresholds for COT sharing that correspond to service types of the multiple services; and
    in a case that an idle channel is detected, transmit the multiple services.

The first device provided in this embodiment of the application can implement the processes that are implemented by the first device in the foregoing method embodiment in FIG. 1. To avoid repetition, details are not described herein again. In the embodiments of this application, when communicating with the second device, the first device may send the indication information to the second device; where the indication information is used to indicate a power detection threshold for COT sharing or a service type, and different power detection thresholds for COT sharing correspond to different service types. In this way, when the first device is a network device and the second device is a terminal device or the first device is a terminal device and the second device is a network device, and the network device shares the COT initiated by the terminal device, the network device can transmit, in the COT initiated by the terminal device, a service corresponding to the indication information.

FIG. 4 is a schematic structural diagram of a second device according to an embodiment of this application. The second device includes a receiving module 41.

The receiving module 41 is configured to receive indication information from a first device; where the indication information is used to indicate a power detection threshold for COT sharing or a service type, and different power detection thresholds for COT sharing correspond to different service types.

In some embodiments, in a case that the first device is a terminal device and the second device is a network device, the receiving module 41 is further configured to:
receive the indication information sent by the first device through uplink control information UCI, and transmit, in a COT initiated by the first device, a service corresponding to the indication information.

In some embodiments, the indication information is valid in a case that the second device shares a COT initiated by the first device.

In some embodiments, the transmitting, by the receiving module 41 in a COT initiated by the first device, a service corresponding to the indication information includes:
in a case that the indication information indicates a first power detection threshold for COT sharing, transmitting, in the COT, a service corresponding to a first service type or a service corresponding to a second service type;
where the first service type is a service type corresponding to the first power detection threshold for COT sharing, and a power detection threshold for COT sharing that corresponds to the second service type is greater than or equal to the first power detection threshold for COT sharing.

In some embodiments, the transmitting, by the receiving module 41 in a COT initiated by the first device, a service corresponding to the indication information includes:
in a case that the indication information indicates a third service type, transmitting, in the COT, a service corresponding to the third service type or a service corresponding to a fourth service type;
where a power detection threshold for COT sharing that corresponds to the fourth service type is greater than or equal to a power detection threshold for COT sharing that corresponds to the third service type.

In some embodiments, the quantity of bits occupied by the indication information is determined according to the number of service types.

In some embodiments, the indication information is further used to indicate whether the first device uses a power detection threshold for COT sharing that corresponds to configuration information of configured grant transmission of the first device;
where different configuration information corresponds to different power detection thresholds for COT sharing.

In some embodiments, the transmitting, by the receiving module 41 in a COT initiated by the first device, a service corresponding to the indication information includes:
in a case that the indication information indicates that the first device uses a second power detection threshold for COT sharing that corresponds to first configuration information, transmitting, in the COT, a service corresponding to a fifth service type or a service corresponding to a sixth service type;
where the fifth service type is a service type corresponding to the second power detection threshold for COT sharing, and a power detection threshold for COT sharing that corresponds to the sixth service type is greater than or equal to the second power detection threshold for COT sharing.

In some embodiments, the quantity of bits occupied by the indication information is 1.

In some embodiments, in a case that the first device is a network device and the second device is a terminal device, the receiving module 41 is further configured to:
receive the indication information sent by the first device through downlink control information DCI, and perform channel monitoring based on a corresponding power detection threshold according to the indication information.

In some embodiments, the indication information is valid in a case that the first device shares a COT initiated by the second device.

The second device provided in this embodiment of the application can implement the processes that are implemented by the second device in the foregoing method embodiment in FIG. 2. To avoid repetition, details are not described herein again. In the embodiments of this application, when the first device communicates with the second device, the second device may receive the indication information from the first device; where the indication information is used to indicate a power detection threshold for COT sharing or a service type, and different power detection thresholds for COT sharing correspond to different service types. In this way, when the first device is a network device and the second device is a terminal device or the first device is a terminal device and the second device is a network device, and the network device shares the COT initiated by the terminal device, the network device can transmit, in the COT initiated by the terminal device, a service corresponding to the indication information.

FIG. 5 is a schematic structural diagram of a terminal device according to an embodiment of this application. As shown in FIG. 5, the terminal device 500 includes at least one processor 501, a memory 502, at least one network interface 504, and a user interface 503. Various components of the terminal device 500 are coupled by using a bus system 505. It can be understood that the bus system 505 is configured to implement a connection and communication between these components. In addition to a data bus, the bus system 505 further includes a power bus, a control bus, and a status signal bus. However, for clear description, various buses are marked as the bus system 505 in FIG. 5.

The user interface 503 may include a display, a keyboard, a clicking device (for example: a mouse and a trackball), a touch panel or a touchscreen.

It can be understood that the memory 502 in the embodiments of this application may be a volatile memory or a nonvolatile memory, or may include a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DRRAM). The memory 502 in the system and the method described in the embodiments of this application is to include but is not limited to these memories.

In some implementations, the memory 502 stores the following elements: an executable module or a data structure, a subset thereof, or an extended set thereof: an operating system 5021 and an application program 5022.

The operating system 5021 includes various system programs, such as a framework layer, a core library layer, a driver layer, and the like, and is configured to implement various basic services and process hardware-based tasks. The application program 5022 includes various application programs, for example, a media player and a browser, and is configured to implement various application services. A program for implementing the method in the embodiments of this application may be included in the application program 5022.

In the embodiments of this application, the terminal device 500 further includes: a computer program stored in the memory 502 and executable on the processor 501. When the computer program is executed by the processor 501, the following steps are performed:
sending indication information to a network device; where the indication information is used to indicate a power detection threshold for COT sharing or a service type, and different power detection thresholds for COT sharing correspond to different service types;
or
receiving indication information from a network device; where the indication information is used to indicate a power detection threshold for COT sharing or a service type, and different power detection thresholds for COT sharing correspond to different service types.

The methods disclosed in the foregoing embodiments of this application may be applied to the processor 501, or may be implemented by the processor 501. The processor 501 may be an integrated circuit chip having a signal processing capability. During implementation, each step of the foregoing method may be completed by using an integrated logic circuit of hardware or an instruction in a form of software in the processor 501. The processor 501 may be a general purpose processor, a Digital Signal Processor (DSP), an Application Specific Integrated Circuit (ASIC), a Field Programmable Gate Array (FPGA), another programmable logic device, a discrete gate or a transistor logic device, or a discrete hardware component. The processor 501 may implement or perform the methods, the steps, and logical block diagrams that are disclosed in the embodiments of this application. The general purpose processor may be a microprocessor or may be any conventional processor or the like. Steps of the methods disclosed with reference to the embodiments of this application may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 502, and the processor 501 reads information from the memory 502 and completes the steps of the foregoing method in combination with hardware of the processor. Specifically, the computer-readable storage medium stores a computer program, and when the computer program is executed by the processor 501, the steps of the foregoing embodiment of the information transmission method with a shared COT are performed.

It can be understood that the embodiments described in the embodiments of this application may be implemented by hardware, software, firmware, middleware, microcode, or a combination thereof. For hardware implementation, a processing unit may be implemented in one or more ASICs, DSPs, DSP Device (DSPD), Programmable Logic Device (PLD), FPGAs, general purpose processors, controllers, microcontrollers, microprocessors, other electronic units configured to perform the functions in this application, or a combination thereof.

For software implementation, the technology in the embodiments of this application may be implemented through modules (for example, procedures or functions) that perform the functions in the embodiments of this application. Software code may be stored in a memory and executed by a processor. The memory may be implemented inside or outside the processor.

In some embodiments, when the computer program is executed by the processor 501, the following step may be further performed:
sending the indication information to a network device through uplink control information UCI.

The indication information is valid in a case that the second device shares a COT initiated by the first device.

The indication information is further used to indicate whether the terminal device uses a power detection threshold for COT sharing that corresponds to configuration information of configured grant transmission of the terminal device;
where different configuration information corresponds to different power detection thresholds for COT sharing.

The quantity of bits occupied by the indication information is 1.

When the computer program is executed by the processor 501, the following steps may be further performed: in a case of transmitting multiple services, monitoring a channel according to a maximum power detection threshold of multiple power detection thresholds for COT sharing that correspond to service types of the multiple services; and
in a case that an idle channel is detected, preferentially transmitting a service corresponding to a service type corresponding to the maximum power detection threshold.

When the computer program is executed by the processor 501, the following steps may be further performed: in a case of transmitting multiple services, monitoring a channel according to a minimum power detection threshold of multiple power detection thresholds for COT sharing that correspond to service types of the multiple services; and
in a case that an idle channel is detected, transmitting the multiple services.

When the computer program is executed by the processor 501, the following steps may be further performed: receiving the indication information sent by the network device through downlink control information DCI, and performing channel monitoring based on a corresponding power detection threshold according to the indication information.

The indication information is valid in a case that the first device shares a COT initiated by the second device.

The terminal device 500 can implement each process implemented by the terminal device in the foregoing embodiment. To avoid repetition, details are not described herein again.

In the embodiments of this application, when communicating with the network device, the terminal device may receive the indication information from the network device; or send the indication information to the network device, where the indication information is used to indicate a power detection threshold for COT sharing or a service type, and different power detection thresholds for COT sharing correspond to different service types. In this way, when sharing the COT initiated by the terminal device, the network device can transmit, in the COT initiated by the terminal device, a service corresponding to the indication information.

Figure 6:
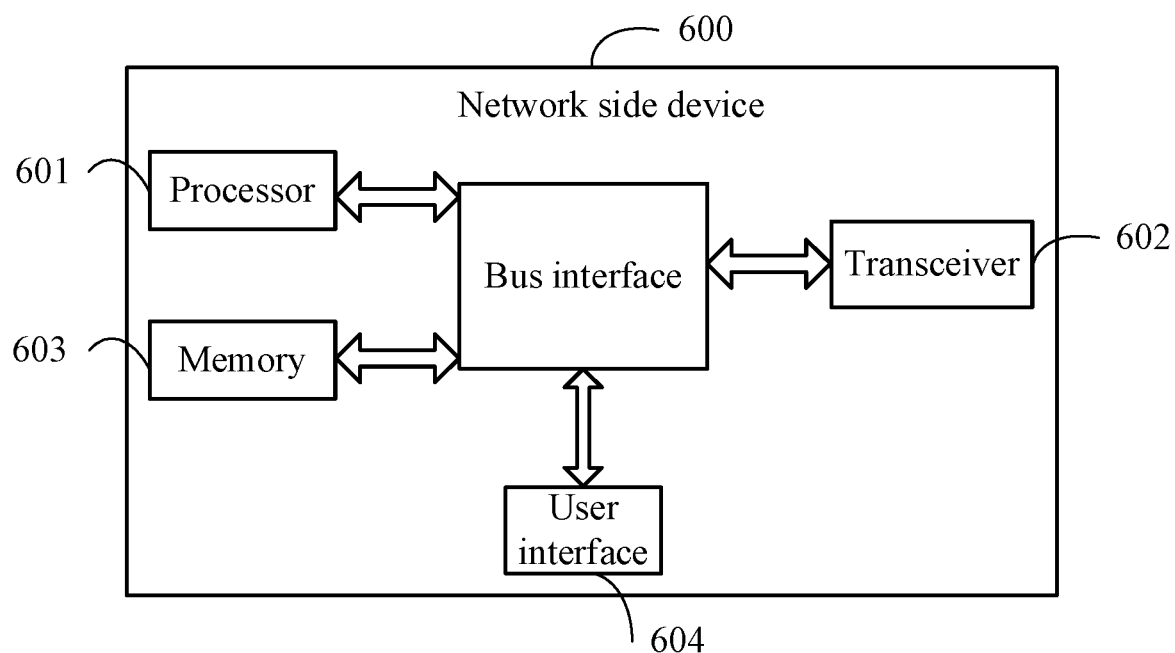
FIG. 6 is a schematic structural diagram of a network device according to an embodiment of this application.

Refer to FIG. 6. FIG. 6 is a structural diagram of a network device applied in an embodiment of this application. As shown in FIG. 6, the network device 600 includes a processor 601, a transceiver 602, a memory 603, a user interface 604, and a bus interface.

In this embodiment of this application, the network device 600 further includes a computer program stored in the memory 603 and executable on the processor 601, and when the computer program is executed by the processor 601, the following steps are implemented:

sending indication information to a terminal device; where the indication information is used to indicate a power detection threshold for COT sharing or a service type, and different power detection thresholds for COT sharing correspond to different service types;

or receiving indication information from a first device; where the indication information is used to indicate a power detection threshold for COT sharing or a service type, and different power detection thresholds for COT sharing correspond to different service types.

In FIG. 6, a bus architecture may include any quantity of interconnected buses and bridges, which are specifically connected together by one or more processors represented by the processor 601 and various circuits of a memory represented by the memory 603. The bus architecture may further link various other circuits such as those of a peripheral device, a voltage regulator, and a power management circuit. These are well known in the art, and therefore are not further described in this specification. The bus interface provides an interface. The transceiver 602 may be a plurality of elements, in other words, include a transmitter and a receiver, and provide a unit for communicating with various other devices on a transmission medium. For different user equipment, a user interface 604 may also be an interface capable of connecting externally and internally to a required device. The connected device includes but is not limited to a keypad, a display, a speaker, a microphone, a joystick, and the like.

The processor 601 is responsible for managing the bus architecture and common processing, and the memory 603 may store data used when the processor 601 performs an operation.

In the embodiments of this application, when communicating with the terminal device, the network device may send the indication information to the terminal device; or receive the indication information from the terminal device, where the indication information is used to indicate a power detection threshold for COT sharing or a service type, and different power detection thresholds for COT sharing correspond to different service types. In this way, when sharing the COT initiated by the terminal device, the network device can transmit, in the COT initiated by the terminal device, a service corresponding to the indication information.

In some embodiments, when the computer program is executed by the processor 603, the following steps may be further performed:

sending the indication information to the terminal device through downlink control information DCI, and transmitting, in a COT initiated by the terminal device, a service corresponding to the indication information.

The indication information is valid in a case that the first device shares a COT initiated by the second device.

In some embodiments, the transmitting, in a COT initiated by the terminal device, a service corresponding to the indication information includes:

in a case that the indication information indicates a first power detection threshold for COT sharing, transmitting, in the COT, a service corresponding to a first service type or a service corresponding to a second service type;

where the first service type is a service type corresponding to the first power detection threshold for COT sharing, and a power detection threshold for COT sharing that corresponds to the second service type is greater than or equal to the first power detection threshold for COT sharing.

In some embodiments, the transmitting, in a COT initiated by the terminal device, a service corresponding to the indication information includes:

in a case that the indication information indicates a third service type, transmitting, in the COT, a service corresponding to the third service type or a service corresponding to a fourth service type;

where a power detection threshold for COT sharing that corresponds to the fourth service type is greater than or equal to a power detection threshold for COT sharing that corresponds to the third service type.

The quantity of bits occupied by the indication information is determined according to the number of service types.

When the computer program is executed by the processor 603, the following steps may be further performed: receiving the indication information sent by the terminal device through uplink control information UCI, and transmitting, in a COT initiated by the terminal device, a service corresponding to the indication information.

The indication information is valid in a case that the second device shares a COT initiated by the first device.

In some embodiments, the transmitting, in a COT initiated by the terminal device, a service corresponding to the indication information includes:

in a case that the indication information indicates a first power detection threshold for COT sharing, transmitting, in the COT, a service corresponding to a first service type or a service corresponding to a second service type;

where the first service type is a service type corresponding to the first power detection threshold for COT sharing, and a power detection threshold for COT sharing that corresponds to the second service type is greater than or equal to the first power detection threshold for COT sharing.

In some embodiments, the transmitting, in a COT initiated by the terminal device, a service corresponding to the indication information includes:

in a case that the indication information indicates a third service type, transmitting, in the COT, a service corresponding to the third service type or a service corresponding to a fourth service type;
where a power detection threshold for COT sharing that corresponds to the fourth service type is greater than or equal to a power detection threshold for COT sharing that corresponds to the third service type.

The quantity of bits occupied by the indication information is determined according to the number of service types.

The indication information is further used to indicate whether the terminal device uses a power detection threshold for COT sharing that corresponds to configuration information of configured grant transmission of the terminal device;
where different configuration information corresponds to different power detection thresholds for COT sharing.

In some embodiments, the transmitting, in a COT initiated by the terminal device, a service corresponding to the indication information includes:
in a case that the indication information indicates that the first device uses a second power detection threshold for COT sharing that corresponds to first configuration information, transmitting, in the COT, a service corresponding to a fifth service type or a service corresponding to a sixth service type;
where the fifth service type is a service type corresponding to the second power detection threshold for COT sharing, and a power detection threshold for COT sharing that corresponds to the sixth service type is greater than or equal to the second power detection threshold for COT sharing.

The quantity of bits occupied by the indication information is 1.

In some embodiments, an embodiment of this application further provides a communications terminal, including a processor 110, a memory 109, and a computer program stored in the memory 109 and executable on the processor 110. When the computer program is executed by the processor 110, each process of the foregoing embodiment of the information transmission method with a shared COT can be implemented, and a same technical effect can be achieved. To avoid repetition, details are not described herein.

An embodiment of the application further provides a computer-readable storage medium. The computer-readable storage medium stores a computer program. When the computer program is executed by the processor, each process of the foregoing embodiment of the information transmission method with a shared COT can be implemented, and a same technical effect can be achieved. To avoid repetition, details are not described herein again. The computer readable storage medium includes a ROM, a RAM, a magnetic disk, an optical disc, or the like.

It should be noted that in this specification, the terms "include", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

The invention claimed is:

1. A method for information transmission with a shared Channel Occupancy Time (COT), comprising:
sending, by a first device, indication information to a second device,
wherein the indication information is used to indicate a power detection threshold for COT sharing or a service type, and different power detection thresholds for COT sharing correspond to different service types,
wherein when the first device is a terminal device and the second device is a network device, the method further comprises:
monitoring, by the first device, a channel according to a maximum power detection threshold of multiple power detection thresholds for COT sharing that correspond to service types of multiple services being transmitted, and when an idle channel is detected, preferentially transmitting, by the first device, a service corresponding to a service type corresponding to the maximum power detection threshold:
or
monitoring, by the first device, a channel according to a minimum power detection threshold of multiple power detection thresholds for COT sharing that correspond to service types of multiple services being transmitted, and when an idle channel is detected, transmitting, by the first device, the multiple services.

2. The method according to claim 1, when the first device is the terminal device and the second device is the network device, the sending, by a first device, indication information to a second device comprises:
sending, by the first device, the indication information to the second device through Uplink Control Information (UCI).

3. The method according to claim 2,
wherein the indication information is valid when the second device shares a COT initiated by the first device.

4. The method according to claim 2,
wherein the indication information occupies one bit and is further used to indicate whether the first device uses a power detection threshold for COT sharing that corresponds to configuration information of configured grant transmission of the first device;
wherein different configuration information corresponds to different power detection thresholds for COT sharing.

5. The method according to claim 1, when the first device is the network device and the second device is the terminal device, the method comprises:
sending the indication information to the second device through downlink control information (DCI), and transmitting, by the first device in a COT initiated by the second device, a service corresponding to the indication information.

6. The method according to claim 5,
wherein the indication information is valid when the first device shares the COT initiated by the second device.

7. The method according to claim 5, wherein the sending, by the first device in a COT initiated by the second device, a service corresponding to the indication information comprises:
when the indication information indicates a first power detection threshold for COT sharing, transmitting, by the first device in the COT, a service corresponding to a first service type or a service corresponding to a second service type;
wherein the first service type is a service type corresponding to the first power detection threshold for COT sharing, and a power detection threshold for COT sharing that corresponds to the second service type is greater than or equal to the first power detection threshold for COT sharing.

8. The method according to claim 5, wherein the sending, by the first device in a COT initiated by the second device, a service corresponding to the indication information comprises:
when the indication information indicates a third service type, transmitting, by the first device in the COT, a service corresponding to the third service type or a service corresponding to a fourth service type;
wherein a power detection threshold for COT sharing that corresponds to the fourth service type is greater than or equal to a power detection threshold for COT sharing that corresponds to the third service type.

9. A method for information transmission with a shared Channel Occupancy Time (COT), comprising:
receiving, by a second device, indication information from a first device,
wherein the indication information is used to indicate a power detection threshold for COT sharing or a service type, and different power detection thresholds for COT sharing correspond to different service types,
wherein when the first device is a terminal device and the second device is a network device, the method further comprises:
receiving, by the second device, the indication information sent by the first device through Uplink Control Information (UCI), and transmitting, in a COT initiated by the first device, a service corresponding to the indication information,
wherein the transmitting, by the second device in a COT initiated by the first device, a service corresponding to the indication information comprises:
when the indication information indicates a third service type, transmitting, by the second device in the COT, a service corresponding to the third service type or a service corresponding to a fourth service type,
wherein a power detection threshold for COT sharing that corresponds to the fourth service type is greater than or equal to a power detection threshold for COT sharing that corresponds to the third service type.

10. The method according to claim 9,
wherein the indication information is valid when the second device shares the COT initiated by the first device.

11. The method according to claim 9, wherein the transmitting, by the second device in a COT initiated by the first device, a service corresponding to the indication information comprises:
when the indication information indicates a first power detection threshold for COT sharing, transmitting, by the second device in the COT, a service corresponding to a first service type or a service corresponding to a second service type;
wherein the first service type is a service type corresponding to the first power detection threshold for COT sharing, and a power detection threshold for COT sharing that corresponds to the second service type is greater than or equal to the first power detection threshold for COT sharing.

12. The method according to claim 9,
wherein the indication information is further used to indicate whether the first device uses a power detection threshold for COT sharing that corresponds to configuration information of configured grant transmission of the first device;
wherein different configuration information corresponds to different power detection thresholds for COT sharing.

13. The method according to claim 12, wherein the transmitting, by the second device in a COT initiated by the first device, a service corresponding to the indication information comprises:
when the indication information indicates that the first device uses a second power detection threshold for COT sharing that corresponds to first configuration information, transmitting, by the second device in the COT, a service corresponding to a fifth service type or a service corresponding to a sixth service type;
wherein the fifth service type is a service type corresponding to the second power detection threshold for COT sharing, and a power detection threshold for COT sharing that corresponds to the sixth service type is greater than or equal to the second power detection threshold for COT sharing.

14. The method according to claim 9, wherein when the first device is a network device and the second device is a terminal device, the method further comprises:
receiving, by the second device, the indication information sent by the first device through Downlink Control Information (DCI), and performing channel monitoring based on a corresponding power detection threshold according to the indication information.

15. The method according to claim 14,
wherein the indication information is valid in a case that the first device shares a COT initiated by the second device.

16. A communications device, comprising a memory storing a computer program and a processor, wherein when executed by the processor, the computer program implements a method for information transmission with a shared Channel Occupancy Time (COT), the method comprising:
sending, by a first device, indication information to a second device,
wherein the indication information is used to indicate a power detection threshold for COT sharing or a service type, and different power detection thresholds for COT sharing correspond to different service types, wherein when the first device is a terminal device and the second device is a network device, the method further comprises:

monitoring, by the first device, a channel according to a maximum power detection threshold of multiple power detection thresholds for COT sharing that correspond to service types of multiple services being transmitted, and when an idle channel is detected, preferentially transmitting, by the first device, a service corresponding to a service type corresponding to the maximum power detection threshold;

or monitoring, by the first device, a channel according to a minimum power detection threshold of multiple power detection thresholds for COT sharing that correspond to service types of multiple services being transmitted, and when an idle channel is detected, transmitting, by the first device, the multiple services.

17. A communications device, comprising a memory storing a computer program and a processor, wherein when executed by the processor, the computer program implements the method for information transmission with a shared Channel Occupancy Time (COT) of claim 9.

* * * * *